(12) United States Patent
Ananthabhotla

(10) Patent No.: US 9,128,625 B1
(45) Date of Patent: Sep. 8, 2015

(54) METHOD AND SYSTEM FOR PHYSICAL MEMORY RESERVATION FOR USER-SPACE PROGRAMS

(75) Inventor: Anand Ananthabhotla, Fremont, CA (US)

(73) Assignee: EMC CORPORATION, Hopkinton, MA (US)

( * ) Notice: Subject to any disclaimer, the term of this patent is extended or adjusted under 35 U.S.C. 154(b) by 836 days.

(21) Appl. No.: 13/430,152

(22) Filed: Mar. 26, 2012

(51) Int. Cl.
*G06F 3/06* (2006.01)
*G06F 9/44* (2006.01)

(52) U.S. Cl.
CPC ............ *G06F 3/0632* (2013.01); *G06F 3/0644* (2013.01); *G06F 9/4401* (2013.01); *G06F 9/4406* (2013.01)

(58) Field of Classification Search
CPC ... G06F 3/0632; G06F 3/0644; G06F 9/4401; G06F 9/4406
See application file for complete search history.

(56) References Cited

U.S. PATENT DOCUMENTS

| | | | |
|---|---|---|---|
| 5,237,669 A * | 8/1993 | Spear et al. | 711/2 |
| 7,529,923 B2 * | 5/2009 | Chartrand et al. | 713/2 |
| 7,549,034 B2 * | 6/2009 | Foster et al. | 711/170 |
| 7,694,195 B2 * | 4/2010 | Khatri et al. | 714/723 |
| 8,151,076 B2 * | 4/2012 | Kamensky et al. | 711/170 |
| 8,171,280 B2 * | 5/2012 | Laue | 713/2 |
| 8,495,351 B2 * | 7/2013 | Arditti et al. | 713/2 |

* cited by examiner

*Primary Examiner* — Thuan Du
(74) *Attorney, Agent, or Firm* — Dergosits & Noah LLP; Todd A. Noah

(57) ABSTRACT

Contiguous regions of physical memory may be reserved for user-space programs through a boot time parameter that specifically identifies the memory region to be reserved. In an implementation, the boot time parameter includes first and second values that are used to define a starting and ending address of the memory region to be reserved. The reserved memory is accessible by the operating system kernel storage and networking stacks so that the user-space programs can use services provided by the kernel storage and networking stacks.

20 Claims, 7 Drawing Sheets

METHOD AND SYSTEM FOR PHYSICAL MEMORY RESERVATION FOR USER-SPACE PROGRAMS

BACKGROUND

The present invention relates to the field of information technology, including, more particularly, to systems and techniques for memory management.

Computers are tasked with some of the world's most difficult problems such as weather forecasting, gene sequencing, simulations, and many others. Yet, computers have also had a tremendous impact on consumers through such devices as the personal computer, smartphone, tablet computer, and so forth. Computers have allowed us to solve complex equations, surf the web, and search libraries of everything from banking records and encyclopedias to our favorite recipes.

Time matters. There is an ever-increasing demand for systems and techniques that enable faster and more efficient transactions. Memory management is a process for managing computer memory and allocating portions of memory to programs. Virtual memory refers to decoupling the memory organization from the actual physical hardware. Generally, applications use memory via virtual addresses. Each time an attempt to access the actual data is made the virtual memory subsystem translates the virtual address to a physical address, which corresponds to the address of the data as seen by the hardware. The address translation process itself is managed by the operating system.

Current memory management techniques, however, are unable to guarantee contiguous portions of physical memory be available to programs while also ensuring that such memory is accessible by the OS kernel storage and networking stacks so that the programs can use the kernel storage and networking services.

Thus, there is a need to provide systems and techniques to reserve memory while still retaining the ability to allow read/write access by the kernel storage and networking stacks.

DETAILED DESCRIPTION

Figure 1:
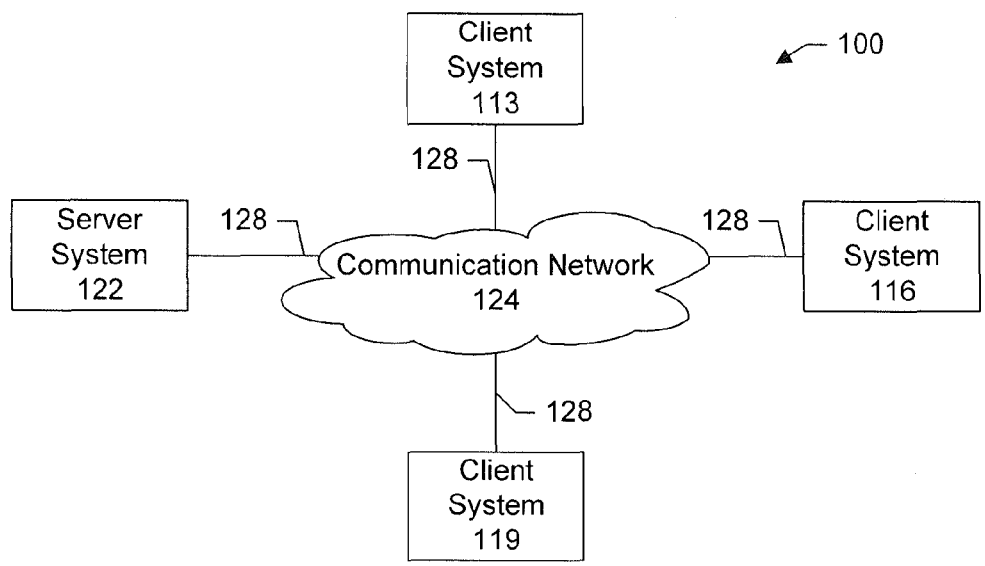
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
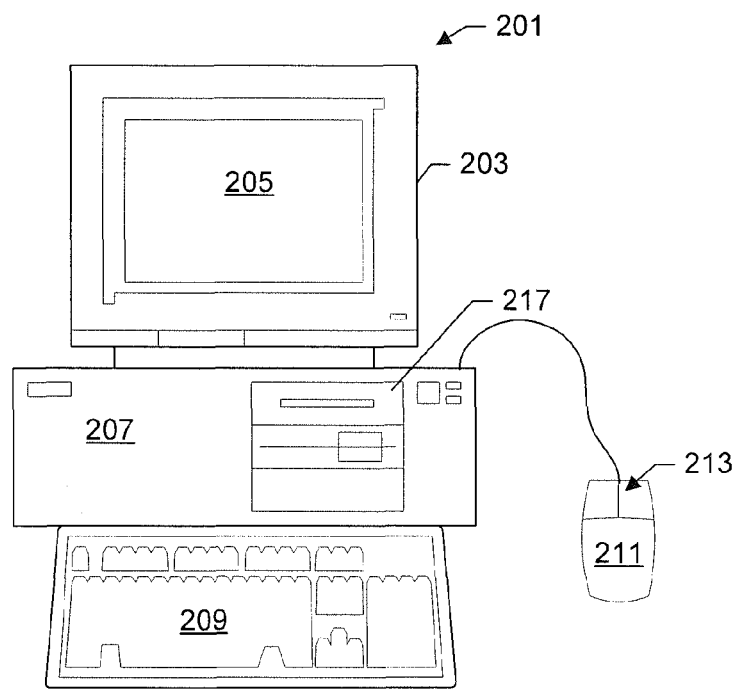
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
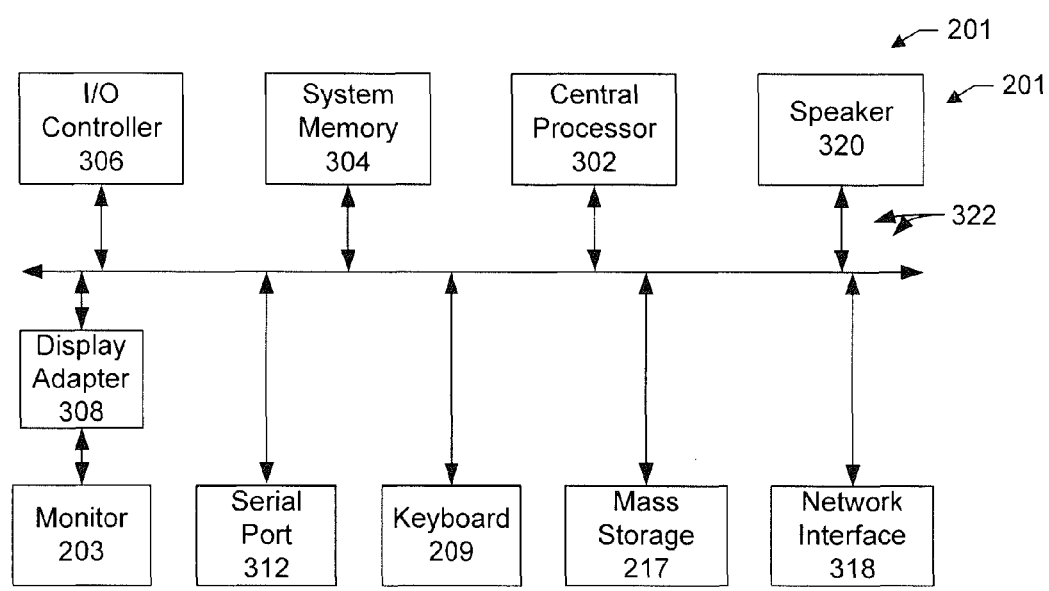
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
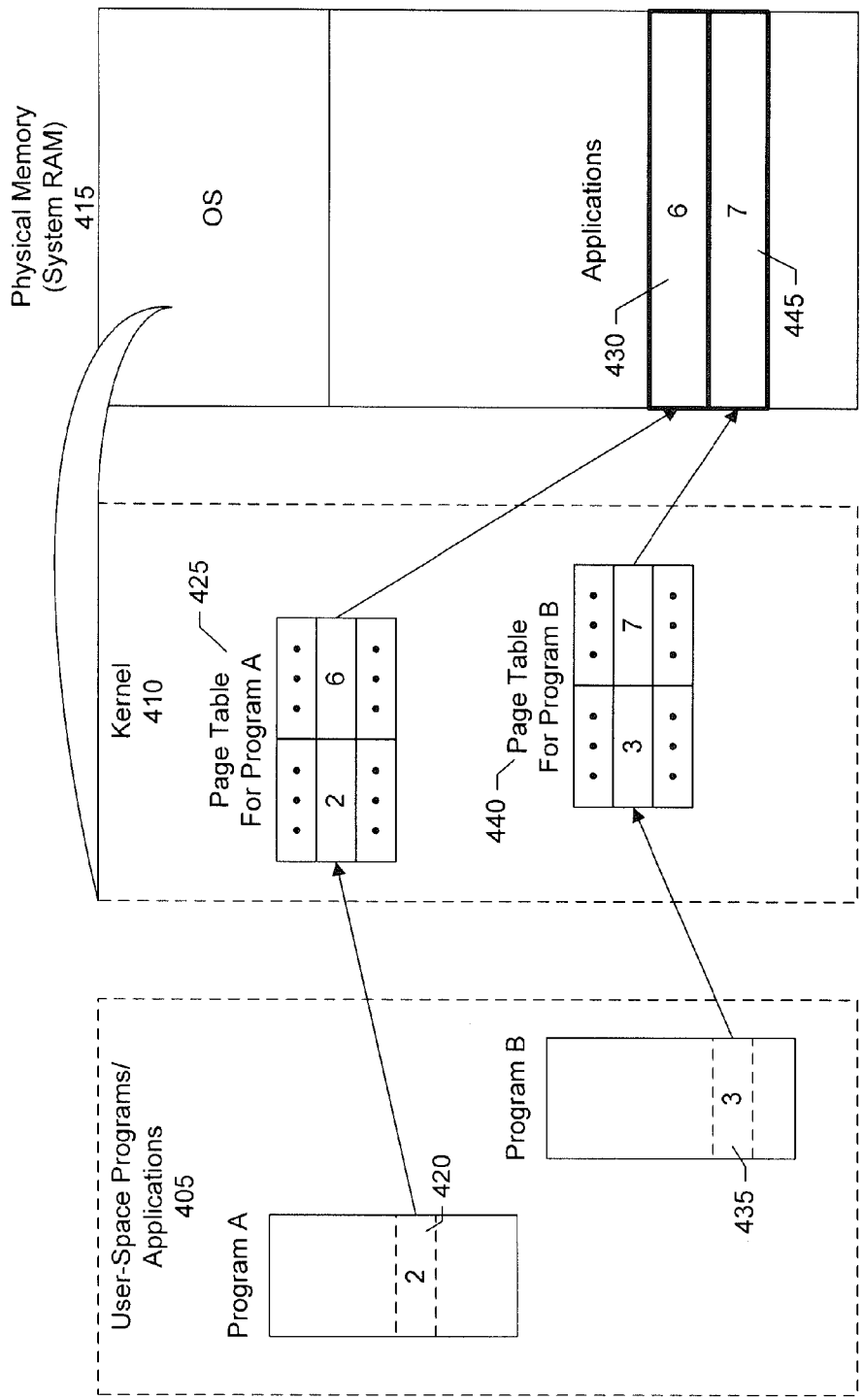
FIG. 4 shows a schematic diagram of user-space programs accessing reserved contiguous blocks of physical memory as provided by an implementation of the invention.

FIG. 4 shows a schematic diagram of user-space programs accessing reserved contiguous blocks of physical memory as provided by an implementation of the invention. As shown in the example of FIG. 4, there are user-space programs or applications 405 such as user-space programs A and B, a kernel 410, and physical or real system memory, i.e., system RAM 415. Some portions of the memory may be used by the kernel or operating system. Other portions of the memory may be used by the programs or applications.

A technique of the invention allows for identifying specific regions or chunks of contiguous physical memory (e.g., by physical memory address) to be reserved for user-space programs. That is, the reserved physical memory includes physical or real memory addresses that are consecutive, successive, uninterrupted, or continuous. There can be a reserved range of physical addresses corresponding to a memory size where each address follows another address in the range without interruption from a beginning address to an ending address of the range. Each address in the reserved range references a chunk of physical memory to be used by a user-space program.

Reserving contiguous chunks of memory for user-space programs can offer several benefits including allowing for more efficient processing because the reserved memory can be used as a cache in a storage system. The reserved memory may be used to perform disk input/output (IO) using the kernel's IO facilities. For example, an application making an IO request can do so using the kernel software layers and device drivers rather than having to directly access the disk device for IO. Thus, the requesting application can take advantage of the services offered by the kernel software layers and device drivers. Further, in the event of a system crash, having contiguous chunks of memory facilitates the dumping of the memory contents to disk. Having large contiguous chunks of memory makes it easy to communicate to a crash-protection firmware program what portion of the memory should be dumped to disk.

In an operating system, such as Linux, user space programs may run in a virtual memory environment as indicated by the broken line in the figure. Each virtual memory address may be mapped by the operating system to a physical memory address. The kernel maintains, among other things, a page table that maps a virtual memory address to a physical memory address. For example, a virtual memory 420 having a virtual address "2" may be used by program A. A page table 425 maintained by the kernel for program A may map virtual address "2" to a physical address "6" which identifies a physical memory region 430.

Similarly, a virtual memory 435 having a virtual address "3" may be used by program B. A page table 440 maintained by the kernel for program B may map virtual address "3" to a physical address "7" which identifies a physical memory region 445. As shown in the example of FIG. 4, memory regions 430 and 445 are contiguous. Physical memory addresses "6" and "7," which point to memory regions 430 and 445, respectively, are consecutive. That is, physical memory address "6" follows physical memory address "7" without interruption. It is noted that the memory address values are shown using decimal notation for clarity. A person of skill in the art, however, would recognize that typically hexadecimal notation is used to represent memory addresses (e.g., 00000000h, 80000000h, or FFFFFFFFh).

Generally, OS memory allocators, such as the Linux memory allocator return, memory which may not be contiguous in the physical address space. That is, there is no guarantee of contiguous chunks of system RAM (random access memory). During operating system boot up, there is no control or no provision for identifying the exact or specific regions of system RAM to reserve.

For example, the Linux driver referred to as "bigphysarea" is unable to allocate or reserve specific physical contiguous blocks of memory (identified via starting and ending physical address) from a reserved memory pool during boot time. There is no control over the exact start and end physical addresses of the reserved regions. Further, this reservation scheme requires a kernel module to be implemented that can allocate memory on behalf of user-space programs. Other reservation schemes in Linux have the undesirable result of preventing the kernel storage and networking stacks from being used to transfer data directly to/from these regions because the boot time parameters cause the memory regions to be hidden from the kernel.

In an embodiment, a system and technique of the invention allows the exact start and end addresses of reserved memory regions to be specified through boot time parameters, does not require a kernel module that allocates the reserved memory on behalf of user-space programs, and allows the kernel storage and networking stacks to be used to transfer data directly to/from the reserved regions.

More particularly, embedded systems increasingly rely on a thin kernel and push most of the complexity to user-space programs. Since embedded systems typically deal with specialized hardware, the control of some of that hardware falls to user-space programs. This has resulted in an increased usage of user-mode device drivers. Some products, such as VNXe provided by EMC Corporation of Hopkinton, Mass. use such user-mode drivers embedded into user-space programs that provide a number of services layered on top of the basic hardware capabilities. Typically, such programs use a mix of operating system services and direct hardware control.

When working directly with hardware it is desirable to have full knowledge and control of physical memory. Hardware devices are not aware of virtual memory and paging constructs used by software. Instead, they access memory directly using their physical addresses. The memory access may be required for several reasons, including shared memory for work queues and data transfer. Software, on the other hand, does not address memory using physical addresses but instead uses virtual addresses that are mapped to the corresponding physical addresses. For this reason, user-mode drivers need to have the required range of physical memory mapped into their virtual address space and be aware of the virtual to physical address mapping. This is different from normal user program usage of memory in a couple of ways—a normal program does not have control over which portion of physical memory is available to it and when, and it does not have access to its virtual to physical mapping.

In addition to being accessible by user-space programs, it is desirable that the memory thus reserved is also accessible by the OS kernel storage and networking stacks. This allows the user-space program to also use the kernel storage and networking services. Doing so requires the kernel to maintain bookkeeping data structures for such memory—including kernel page tables and page descriptors. In the absence of such data structures, any IO buffers in the reserved memory have to be copied into unreserved memory before reading/writing to it using the storage or networking stacks in the kernel. In a specific embodiment, a technique of the invention provides for reserving memory while still retaining the ability to allow read/write access by the kernel storage and networking stacks.

In a specific implementation, a system and technique provides for one or more of:

1. A new boot time parameter to specify ranges of memory to be reserved for user-space programs by providing the start address of each region.

2. An algorithm in the kernel to mark these ranges as special purpose in the kernel's copy of the E820 memory map, which is a map provided by the system BIOS containing the start and end addresses of valid memory regions.

3. Modification to the kernel memory initialization sequence to allocate kernel page tables and page descriptors and prevent allocation of the said ranges for general kernel use.

4. A mechanism for user-space programs to retrieve the start and end addresses of the reserved ranges.

Figure 5:
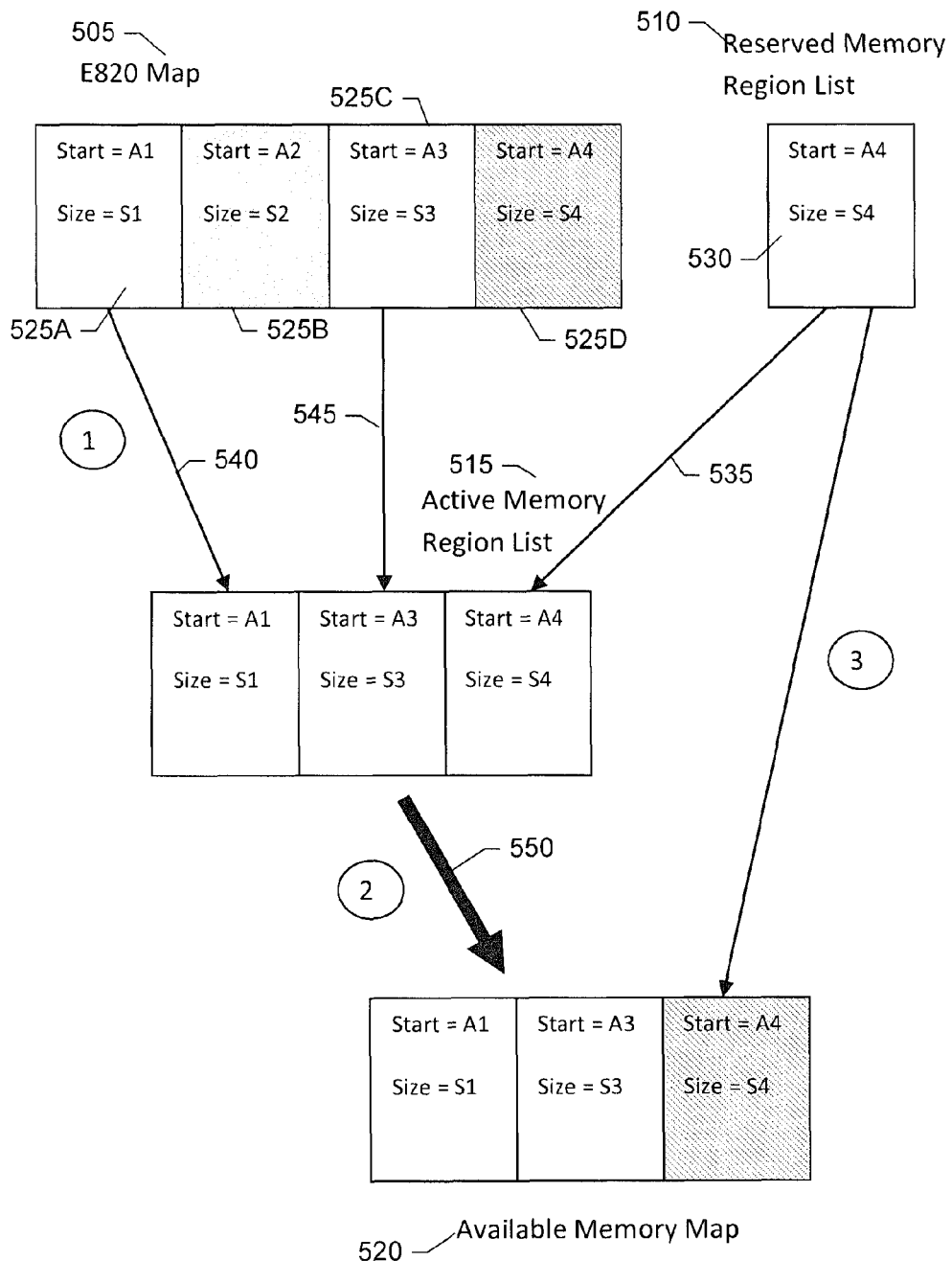
FIG. 5 shows a schematic diagram of data structures that may be used for reserving contiguous regions of physical memory for user-space programs.

FIG. 5 shows a schematic diagram of data structures used in a specific implementation of a technique to reserve physical memory for user-space programs. As shown in the example of FIG. 5, there is an E820 map 505, a reserved memory region list 510, an active memory region list 515, and an available memory map 520.

In a specific implementation, E820 map 505 is a copy of the system E820 map. More particularly, the kernel saves a copy of the system E820 map on bootup. As discussed above, the E820 map identifies valid memory regions. In this example, the E820 map identifies a first memory region 525A by a starting address A1 and a size S1, a second memory region 525B by a starting address A2 and a size S2, a third memory region 525C by a starting address A3 and a size S3, and a fourth memory region 525D by a starting address A4 and a size S4.

The E820 map, active memory region list, and available memory map are data structures heavily used by the kernel, including the kernel bootup code, code that sets up the page tables and other data structures, and the kernel memory allocator. In a specific implementation, the reserved memory region data structure or list is added to keep track of memory regions reserved for user-space programs in order to reduce the impact to the kernel code. The reserved memory region list can be optional and is not included in other implementations. That is, in another specific implementation, the reserved memory region list is omitted. In this specific implementation, memory reservations for the user-space programs are made without using the reserved memory region list. Omitting the reserved memory region list may be desirable in some implementations such as to facilitate execution. In other implementations, including the reserved memory region is desirable because it can help to reduce the impact on the kernel code (e.g., reduce kernel code modifications, reduce kernel code additions, and shorten development time).

In brief, in a specific implementation, during boot time, the boot time parameter is parsed. An E820 map (or copy of the E820 map) maintained or provided by the kernel is accessed. The E820 map includes a set of entries. Each entry identifies a region of memory available for use by the kernel. Based on the boot time parameter, one or more entries in the E820 map is flagged or marked to indicate that the memory region identified by the entry is to be reserved for the user-space programs. The corresponding entries are also added to a reserved memory region list. Unreserved entries in the E820 map and all entries in the reserved memory region list are added to the active memory region list. The modified kernel code permits memory initialization and adds each entry in the active region list (including the marked entries) to an available memory map. The available memory map identifies regions of memory for use by the kernel. An indication in the available memory map is made so that an entry identifying a memory region that would otherwise be for use by the kernel is reserved. This prevents the memory region from being used by the kernel. The indication may include flagging the added entry in the available memory map or removing the added entry from the available memory map.

Generally, the kernel maintains two different data structures to track available memory—an internal list of active memory regions (active region list), and an available memory map. As discussed above, at boot time, the kernel E820 subsystem makes a copy of the system E820 memory map and parses it, identifying available sections of memory. It adds these to the active region list. In a specific implementation, a technique of the invention provides for a code modification or configuration to also parse the boot time parameter specifying reserved memory ranges and flag these in the active region list.

Subsequently, kernel memory subsystem initialization code calls the E820 subsystem to query valid memory ranges in order to allocate kernel page tables and page descriptors for them. It also adds these ranges to the available memory map that's used later on to determine the memory ranges available for general kernel use. In a specific implementation, there is a step that immediately calls the E820 subsystem to remove any regions from this map that should not be available for general kernel use. At this point, the E820 subsystem removes the reserved regions from the map, thus ensuring that those regions can be safely used by user-space programs.

With this solution, the kernel sees the reserved memory ranges as normal RAM with direct read/write access by the storage and networking stacks, but simply cannot be allocated for general use. Thus, the kernel storage and networking stacks can be used for performing IO to reserved memory without incurring the overhead of memory copying.

Figure 6:
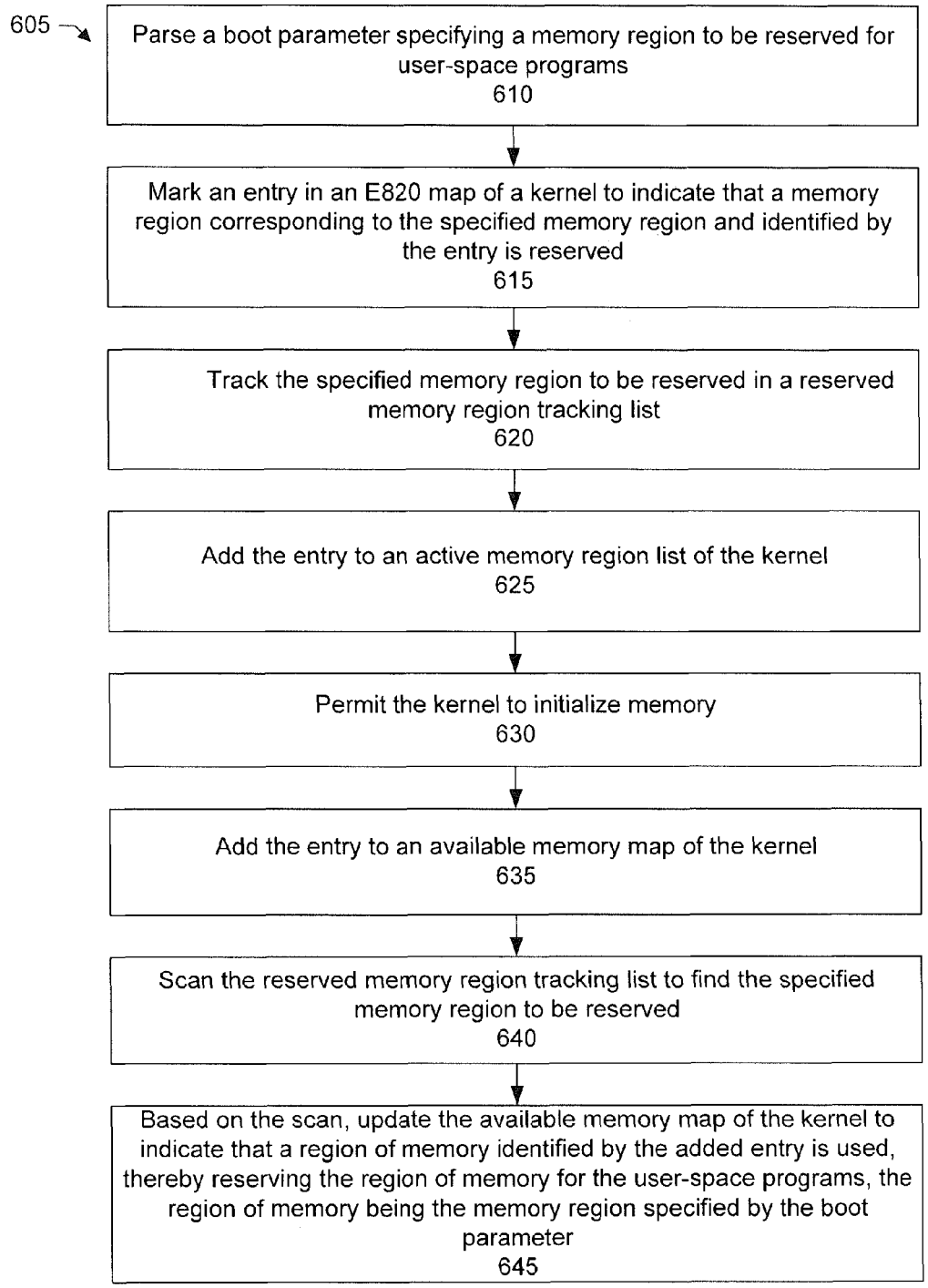
FIG. 6 shows an overall flow of a specific implementation for reserving contiguous regions of physical memory for user-space programs.

FIG. 6 shows a further example of an overall flow 605 of a specific implementation for reserving contiguous regions or chunks of physical memory for user-space programs. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, the system parses a boot time parameter specifying a memory region to be reserved for user-space programs. The boot time parameter is provided to a kernel startup or boot up process or sequence. For example, the boot time parameter may be added in or inserted into a kernel boot up sequence. Boot time refers to that period of time when a computer system is starting up. During boot up, the processor may execute code or instructions stored in read-only memory (ROM). The code stored in ROM may be referred to as the Basic Input/Output System (BIOS).

The boot time parameter specifies a contiguous region of physical memory to be reserved for user-space programs (e.g., reserved for use by one or more user-space programs). The table below shows a specific implementation or form of the boot time parameter.

TABLE

| memmap = ˆ<start>@<size> |
| --- |

Thus, in a specific implementation, a method includes parsing the kernel command line arguments of the form "memmap=ˆ<start>@<size>." In this specific implementation, the boot time parameter includes a first variable or value, and a second variable or value that may be used to define, specify, or identify a starting and ending address of a contiguous region of memory to be reserved. That is, the contiguous region of memory may be at fixed addresses, of a fixed size, or pre-defined, pre-determined, or "hard-coded." In this specific implementation, the first variable is labeled "start." The first variable is followed by the second variable which is labeled "size." The first variable stores, holds, or contains a first value that specifies a starting address of a contiguous region or range of memory to be reserved. The second variable stores a size of the contiguous region of memory to be reserved. The size may be specified, for example, in gigabytes. In another specific implementation, a boot time parameter may include a starting address of the contiguous region of memory to be reserved and an ending address of the contiguous region of memory. A boot time parameter may include a starting address of a contiguous region of memory and a length of the contiguous region of memory to be reserved. Memory addresses may be provided in hexadecimal notation.

In a step 615, the system marks such regions as reserved in the saved copy of the E820 map. To continue with the example shown in FIG. 5, the boot time parameter may specify that a memory region having a start address A4 and a size S4 is to be reserved for the user-space programs. The parameter is parsed to identify the specified memory region to be reserved. After the parameter is parsed and the specified memory region identified, an indication is made in the copy of E820 map 505 that the specified memory region is reserved. For example, as shown in FIG. 5, fourth memory region 525D having the start address A4 and size S4 has been filled with a diagonal pattern to indicate that it has been reserved.

In a step 620, the system tracks the reserved memory region. In a specific implementation, the reserved memory region is tracked by creating or generating a reserved memory region list or tracking list 510 (FIG. 5). To track the specified memory region, an indication, record, or entry 530 is made in or added to list 510. As shown in FIG. 5, entry 530 identifies the specific memory region to be reserved via its starting address (e.g., A4) and size (e.g., S4). It should be appreciated that the reserved memory region list can track any number of entries identifying memory regions to be reserved.

In a step 625, the system adds the entry or otherwise makes an entry identifying the specific memory region to be reserved to the active memory region list. For example, as shown in FIG. 5, an arrow 535 indicates entry 530 from reserved memory region list 510 being added to active memory region list 515. In a specific implementation, unreserved entries from E820 map 505 are also added to active memory region list as shown by arrows 540 and 545. In a specific implementation, the modified kernel—as shown by a step (1) (FIG. 5)—takes all unreserved entries from E820 map 505, as well as all entries from the reserved memory region list 510 and adds them to active memory region list 515.

Thus, as shown in the example of FIG. 5, the active memory region list includes an entry identifying a memory region with a start address A4 and size S4 (i.e., entry 530 from reserved memory region list 510), an entry identifying a memory region with a start address A1 and size S1, and an entry identifying a memory region with a start address A3 and size S3 from E820 map 505. Although FIG. 5 shows three entries, one of which identifies a memory region to be reserved, it should be appreciated that FIG. 5 is merely an example. There can be any number of reserved entries and any number of unreserved entries.

In a step 630, the active region list (having the reserved and unreserved entries) is then used to initialize kernel data structures such as page tables and page descriptors. In other words, the kernel is permitted to initialize memory.

In a step 635, the system adds the entry identifying the specific memory region to be reserved to the available memory map. Unreserved entries are also added to the available memory map. In other words, in a specific implementation, after the initialization—as shown by a step (2) and an arrow 550 (FIG. 5)—the modified kernel takes all entries from the active memory region list and adds them to the available memory map. The available memory map is used by the kernel memory allocator to decide which portions of memory can be allocated for general system use.

In a step 640, the system scans, examines, or consults reserved memory region list 510 to find one or more reserved memory regions tracked by the reserved memory region list. In this example, upon scanning the reserved memory region list, the system encounters entry 530 which identifies the reserved memory region having the start address A4 and size S4.

In a step 645, based on the scan, the system updates the available memory map of the kernel—as shown by a step (3) (FIG. 5)—to indicate that a region of memory identified in the available memory map (and corresponding to the entry tracked in the reserved memory region list) is used. This reserves the region of memory for the use by the user-space programs. For example, as shown in FIG. 5, the available memory map includes an identification of a memory region having a start address A4 and a size S4. A diagonal pattern has been applied to the region to indicate that it is used or is otherwise reserved. In other words, in a specific implementation, before continuing with the kernel bootup, the system scans the reserved memory region list and marks the corresponding regions in the available memory map as used. This makes those regions unavailable for general system use.

Figure 7:
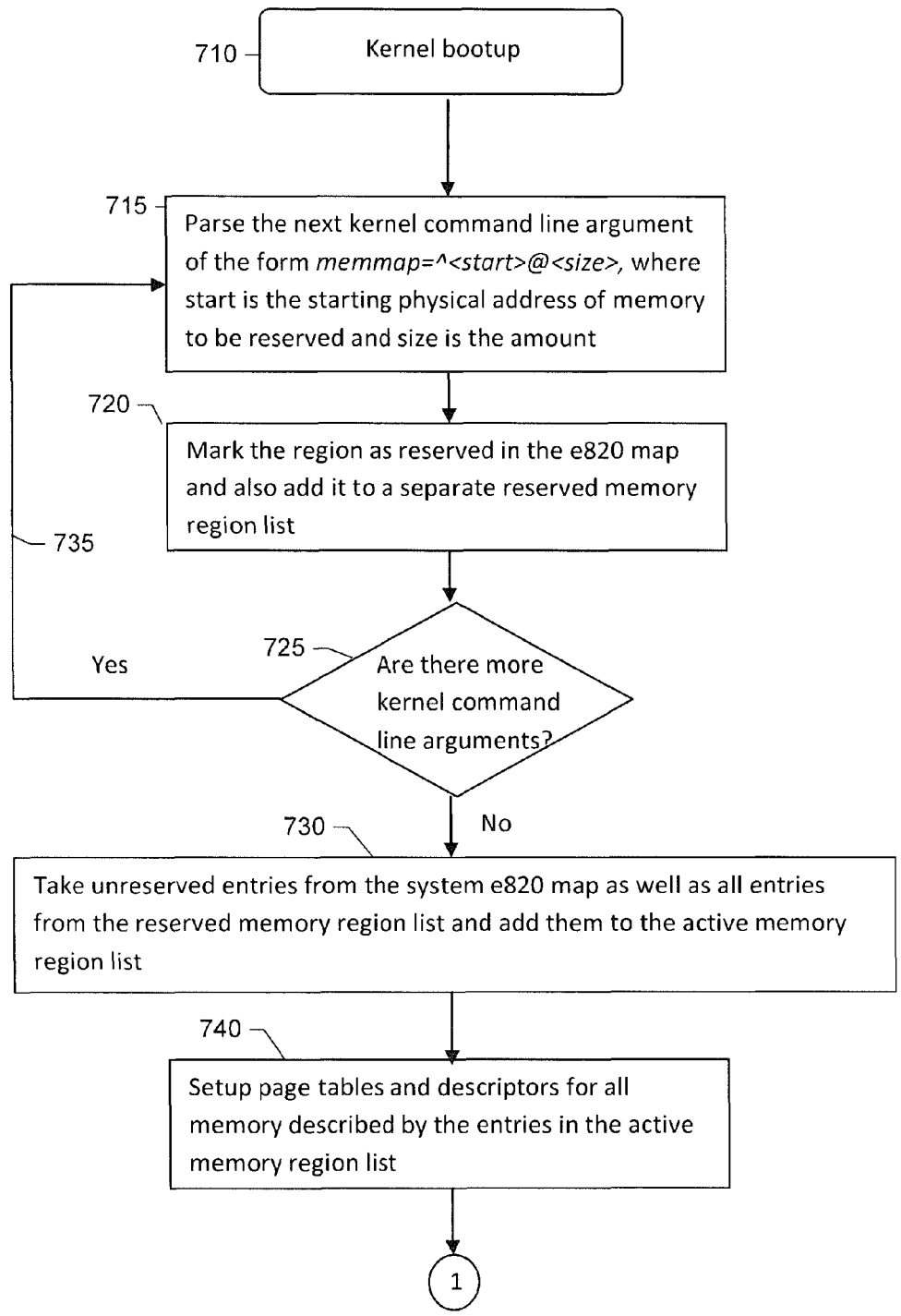
FIG. 7 shows another example of a flow of a specific implementation for physical memory reservations.
Figure 8:
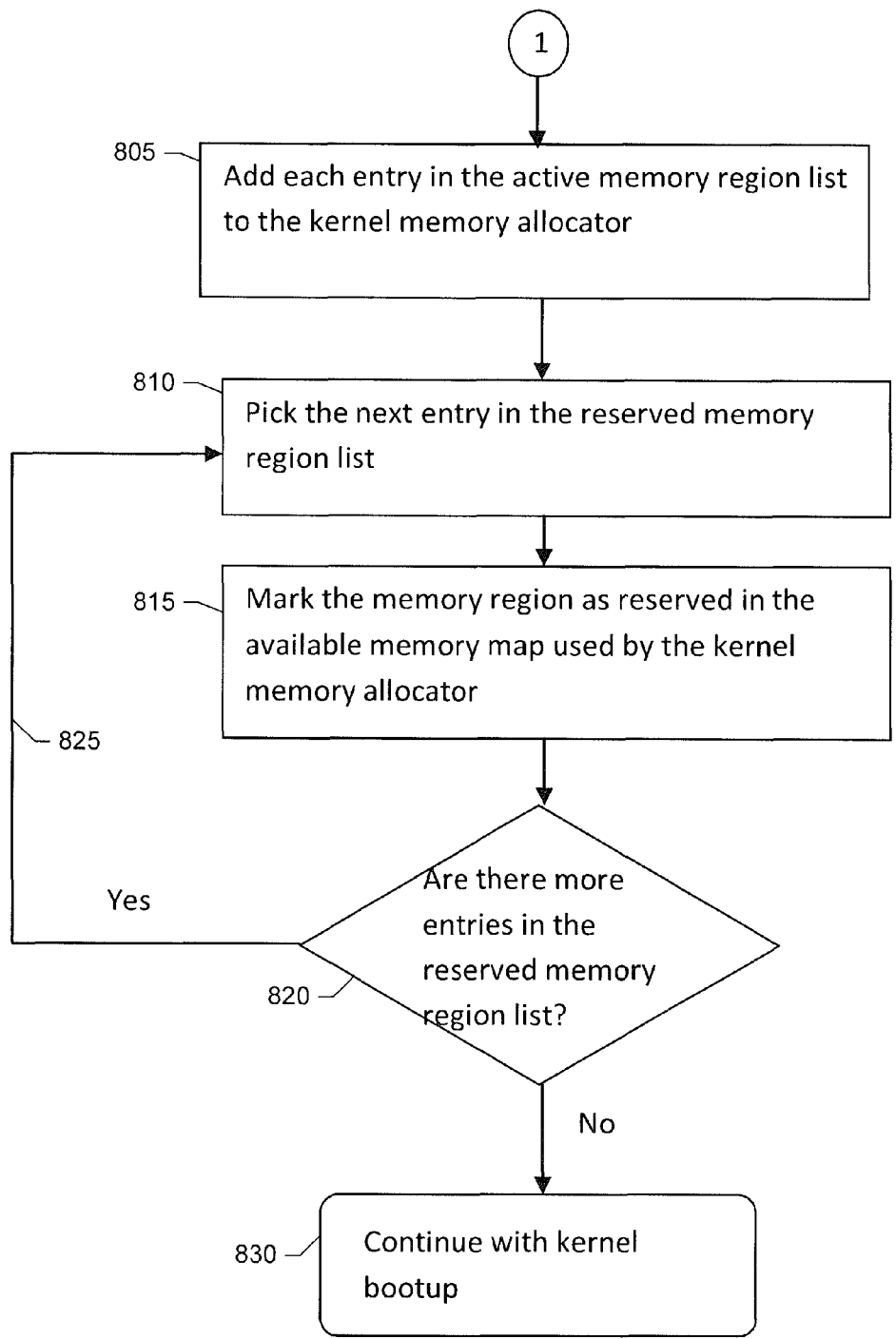
FIG. 8 shows a continuation of the flow shown in FIG. 7.

FIG. 7 shows another example of a flow of a specific implementation for physical memory reservation for user-space programs. FIG. 8 shows a continuation of the flow shown in FIG. 7. Referring now to FIG. 7, in a step 710, the kernel begins booting up. In a step 715, a kernel command line argument having the form "memmap=^<start>@size" is parsed—i.e., the physical memory reservation boot time parameter as discussed above. "Start" refers to the starting physical address of memory to be reserved. "Size" refers to the amount of the physical memory to be reserved. In a step 720, the region is marked as reserved in the E820 map and is also added to a separate reserved memory region list so that the region can be tracked.

In a step 725, a determination is made of whether there are more kernel command line arguments. If there are more kernel command line arguments, the system loops 735 back to step 715 to parse any other command line arguments having the physical memory reservation boot time parameter. If there are no more kernel command line arguments, in a step 730 the system takes unreserved entries from the system E820 map as well as all entries from the reserved memory region list and adds them to the active memory region list. In a step 740, memory is initialized. For example, the kernel may be permitted to setup page tables and descriptors for all memory described by the entries in the active memory region list.

Referring now to FIG. 8, in a step 805 each entry in the active memory region list is added to the kernel memory allocator. In a step 810, the system consults the reserved memory region list and selects an entry from the reserved memory region list. In a step 815, the system marks the memory region corresponding to the selected entry from the reserved memory region list as reserved in the available memory map used by the kernel memory allocator.

In a step 820, the system determines whether there are more, additional, or other entries in the reserved memory region list. If there are other entries, the system loops 825 back to step 810 to select a next or remaining entry from the reserved memory region list. If there are no other entries, the system permits the kernel to continue with the boot up (step 830).

In a specific embodiment, systems and techniques for physical memory reservation for user-space programs are implemented in the Linux operating system. Principles and aspects of the invention, however, can be applicable to other operating systems. Some examples of other operating systems include Mac OS X provided by Apple, Inc., Microsoft Windows provided by Microsoft Corporation, Google Chrome OS provided by Google, and others.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for reserving memory of a computer system comprising:
   parsing a boot parameter that specifies a memory region to be reserved for user-space programs;
   marking an entry in an E820 map of an operating system kernel to indicate that a memory region corresponding to the specified memory region and identified by the entry is reserved;
   adding the entry identifying the specified memory region to an active memory region list and tracking the specified memory region in a reserved memory region tracking list;
   permitting the kernel to initialize memory using the active memory region list having the added entry;
   after the memory initialization, adding the entry to an available memory map;
   scanning the reserved memory region tracking list to identify the specified memory region that is to be reserved; and
   based on the scan, updating the available memory map to indicate that a region of memory identified by the added entry is used, thereby reserving the region of memory for the user-space programs, the region of memory being the memory region specified by the boot parameter.

2. The method of claim 1 wherein the entry is a first entry and the method comprises:
   adding a second entry from the E820 map to the active memory region list, wherein the second entry identifies a region of memory that is not reserved for the user-space programs,
   the active memory region list thereby comprising the second entry, and the first entry, wherein the first entry identifies the specified memory region reserved for the user-space programs, and the second entry identifies the region of memory that is not reserved for the user-space programs.

3. The method of claim 2 comprising:
   adding the second entry from the active memory region list to the available memory map, the available memory map thereby comprising the second entry, and the first entry, wherein the first entry identifies the specified memory region reserved for the user-space programs, and the second entry identifies the region of memory that is not reserved for the user-space programs.

4. The method of claim 1 wherein the boot parameter comprises a first value, and a second value to identify a physical starting address and a physical ending address of the memory region to be reserved.

5. The method of claim 1 wherein the boot parameter comprises a physical starting address, and a size of the memory region to be reserved.

6. The method of claim 1 wherein a form of the boot parameter is "memmap=^<start>@<size>," and wherein the "start" variable stores a physical starting address of the memory region to be reserved, and the "size" variable stores a size of the memory region to be reserved.

7. The method of claim 1 wherein after the updating the available memory map, kernel storage and networking stacks are capable of accessing the contiguous memory region, thereby allowing the user-space programs to use services provided by the kernel storage and networking stacks.

8. The method of claim 1 wherein the E820 map comprises a copy of an E820 map provided by a BIOS of the computer system.

9. The method of claim 1 wherein the operating system kernel comprises Linux.

10. A computer program product, comprising a non-transitory computer-readable medium having a computer-readable program code embodied therein, the computer-readable program code adapted to be executed by one or more processors to implement a method comprising:
    parsing a boot parameter that specifies a memory region to be reserved for user-space programs;
    marking an entry in an E820 map of an operating system kernel to indicate that a memory region corresponding to the specified memory region and identified by the entry is reserved;
    adding the entry identifying the specified memory region to an active memory region list and tracking the specified memory region in a reserved memory region tracking list;
    permitting the kernel to initialize memory using the active memory region list having the added entry;
    after the memory initialization, adding the entry to an available memory map;
    scanning the reserved memory region tracking list to identify the specified memory region that is to be reserved; and
    based on the scan, updating the available memory map to indicate that a region of memory identified by the added entry is used, thereby reserving the region of memory for the user-space programs, the region of memory being the memory region specified by the boot parameter.

11. The computer program product of claim 10 wherein the entry is a first entry and the method comprises:
    adding a second entry from the E820 map to the active memory region list, wherein the second entry identifies a region of memory that is not reserved for the user-space programs,
    the active memory region list thereby comprising the second entry, and the first entry, wherein the first entry identifies the specified memory region reserved for the user-space programs, and the second entry identifies the region of memory that is not reserved for the user-space programs.

12. The computer program product of claim 11 wherein the method comprises:
    adding the second entry from the active memory region list to the available memory map, the available memory map thereby comprising the second entry, and the first entry, wherein the first entry identifies the specified memory region reserved for the user-space programs, and the second entry identifies the region of memory that is not reserved for the user-space programs.

13. The computer program product of claim 10 wherein the boot parameter comprises a physical starting address, and a size of the memory region to be reserved.

14. The computer program product of claim 10 wherein after the updating the available memory map, kernel storage and networking stacks are capable of accessing the contiguous memory region, thereby allowing the user-space programs to use services provided by the kernel storage and networking stacks.

15. The computer program product of claim 10 wherein the E820 map comprises a copy of an E820 map provided by a BIOS of the computer system.

16. A system for memory management, the system comprising:

a processor-based memory management system executed on a computer system and configured to:

parse a boot parameter that specifies a memory region to be reserved for user-space programs;

mark an entry in an E820 map of an operating system kernel to indicate that a memory region corresponding to the specified memory region and identified by the entry is reserved;

add the entry identifying the specified memory region to an active memory region list and tracking the specified memory region in a reserved memory region tracking list;

permit the kernel to initialize memory using the active memory region list having the added entry;

after the memory initialization, add the entry to an available memory map;

scan the reserved memory region tracking list to identify the specified memory region that is to be reserved; and based on the scan, update the available memory map to indicate that a region of memory identified by the added entry is used, thereby reserving the region of memory for the user-space programs, the region of memory being the memory region specified by the boot parameter.

17. The system of claim 16 wherein the entry is a first entry and the processor-based memory management system is configured to:

add a second entry from the E820 map to the active memory region list, wherein the second entry identifies a region of memory that is not reserved for the user-space programs, the active memory region list thereby comprising the second entry, and the first entry, wherein the first entry identifies the specified memory region reserved for the user-space programs, and the second entry identifies the region of memory that is not reserved for the user-space programs.

18. The system of claim 17 wherein the entry is a first entry and the processor-based memory management system is configured to:

add the second entry from the active memory region list to the available memory map, the available memory map thereby comprising the second entry, and the first entry, wherein the first entry identifies the specified memory region reserved for the user-space programs, and the second entry identifies the region of memory that is not reserved for the user-space programs.

19. The system of claim 16 wherein the boot parameter comprises a first value, and a second value to identify a physical starting address and a physical ending address of the memory region to be reserved.

20. The system of claim 16 wherein the operating system kernel comprises Linux.

* * * * *